(12) United States Patent
Wu

(10) Patent No.: US 12,722,039 B1
(45) Date of Patent: Sep. 1, 2026

(54) CAT EXERCISE WHEEL

(71) Applicant: HONG KONG WUDI INTERNATIONAL TRADING CO., LIMITED, Hong Kong (CN)

(72) Inventor: Peng Wu, Shanghai (CN)

(73) Assignee: HONG KONG WUDI INTERNATIONAL TRADING CO., LIMITED, Hong Kong (CN)

(*) Notice: Subject to any disclaimer, the term of this patent is extended or adjusted under 35 U.S.C. 154(b) by 0 days.

(21) Appl. No.: 19/534,658

(22) Filed: Feb. 9, 2026

(30) Foreign Application Priority Data

Jan. 13, 2026 (CN) ........................ 202620039755.0

(51) Int. Cl.
*A63B 21/045* (2006.01)
*A01K 15/02* (2006.01)
*A63B 23/02* (2006.01)

(52) U.S. Cl.
CPC ........ *A63B 23/0211* (2013.01); *A01K 15/027* (2013.01); *A63B 21/045* (2013.01); *A63B 23/0216* (2013.01)

(58) Field of Classification Search
USPC ................................ 119/700, 702; D30/160
See application file for complete search history.

(56) References Cited

U.S. PATENT DOCUMENTS 883,485 A * 3/1908 Ridgway ............... A63G 31/14 472/137
3,536,324 A * 10/1970 Ahrens ................. A63B 19/04 104/77
4,389,047 A * 6/1983 Hall .................. A63B 21/0054 482/54
5,125,361 A * 6/1992 Rowlands ........... A01K 15/027 119/700
11,202,441 B2 * 12/2021 Kim ..................... F21V 33/008
D1,098,628 S * 10/2025 Wu ............................ D30/160

(Continued)

FOREIGN PATENT DOCUMENTS

BR 202016018120 * 2/2018 ............. A01K 15/00
CN 219323071 * 7/2023 ............. A01K 15/02
CN 222924797 * 5/2025 ............. F16C 19/16

(Continued)

*Primary Examiner* — Andrea M Valenti

(74) *Attorney, Agent, or Firm* — Bayramoglu Law Offices LLC

(57) ABSTRACT

A cat exercise wheel includes an exercise wheel assembly, brackets, and exercise wheel supporting crossbars, where two brackets are installed side-by-side on two sides of the exercise wheel assembly; at least two exercise wheel supporting crossbars are arranged side-by-side and detachably installed between the two brackets, and the exercise wheel assembly is erected on the exercise wheel supporting crossbars; and a silent bearing is installed on the exercise wheel supporting crossbar, an outer edge of an exercise wheel bracket of the exercise wheel assembly has a contact portion protruding radially, and the contact portion of the outer edge of the exercise wheel bracket is in contact with the soft rubber contact portion of the silent bearing. The brackets and the exercise wheel supporting crossbars are detachably installed to form an exercise wheel base. The exercise wheel assembly is erected on the base to complete installation.

9 Claims, 5 Drawing Sheets

(56) References Cited

U.S. PATENT DOCUMENTS

2016/0007569 A1 * 1/2016 Farley .................. A01K 15/027
119/702

FOREIGN PATENT DOCUMENTS

| | | | | |
|---|---|---|---|---|
| FR | 2464732 | * | 3/1981 | ......... A63B 2208/12 |
| FR | 202006017220 | * | 3/2007 | ............... F03G 5/02 |
| KR | 20240001603 | * | 1/2024 | ........... A01K 15/027 |
| KR | 20260000868 | * | 1/2026 | ........... A01K 15/027 |

* cited by examiner

CAT EXERCISE WHEEL

CROSS REFERENCE TO THE RELATED APPLICATIONS

This application is based upon and claims priority to Chinese Patent Application No. 202620039755.0, filed on Jan. 13, 2026, the entire contents of which are incorporated herein by reference.

TECHNICAL FIELD

The present disclosure relates to the technical field of pet supplies, specifically to a cat exercise wheel.

BACKGROUND

A cat exercise wheel is an active exercise device designed specifically for indoor cats. Through a safe and controllable running motion, it helps cats engage in regular, aerobic physical activity. Although domestic cats live indoors, they still retain their natural instincts for hunting, running, and explosive sprints. The cat exercise wheel provides cats with a way to exercise that closely resembles natural running, compensating for the limited activity caused by insufficient indoor space. Modern domestic cats generally suffer from insufficient exercise, easily leading to health problems such as obesity, increased joint stress, and decreased cardiopulmonary function. The cat exercise wheel can help cats establish a daily exercise habit, maintaining a healthy weight and a muscle condition. Cats lacking exercise are more prone to stress responses such as anxiety, destructing furniture, aggressive behavior, or excessive grooming. Regular physical exertion helps release energy, stabilize emotions, and improve overall behavioral performance. The cat exercise wheel is not only an exercise tool but can also become part of a cat's daily activities, enriching the environment and making indoor life more varied and enjoyable.

Most cat exercise wheels on the market are currently one-piece designs, making them bulky, difficult to assemble and disassemble, and inconvenient to move. They also tend to generates loud sound when cats run on the exercise wheels. If the cat exercise wheel produces noticeable friction sound, bearing sound, or structural resonant sound during operation, it can easily disrupt daily life, rest, and work. Cats are extremely sensitive to sound; unusual metallic friction sounds, vibration sounds, or irregular noises can easily trigger alertness and stress responses. Exercise wheels with low noise and smooth operation are more readily accepted by cats, encouraging long-term, repeated, and independent use, thus truly achieving the goals of exercise and health management.

SUMMARY

To address the shortcomings of the prior art, an objective of the present disclosure is to provide a cat exercise wheel.

The cat exercise wheel provided by the present disclosure includes an exercise wheel assembly, brackets, and exercise wheel supporting crossbars, where two brackets are installed side-by-side on two sides of the exercise wheel assembly;

at least two exercise wheel supporting crossbars are arranged side-by-side and detachably installed between the two brackets, and the exercise wheel assembly is erected on the exercise wheel supporting crossbars; and a silent bearing is installed on the exercise wheel supporting crossbar, an outer ring of the silent bearing has a soft rubber contact portion, an outer edge of an exercise wheel bracket of the exercise wheel assembly has a contact portion protruding radially, and the contact portion of the outer edge of the exercise wheel bracket is in contact with the soft rubber contact portion of the silent bearing.

Preferably, the exercise wheel assembly includes the exercise wheel brackets, exercise wheel root bars, and an exercise wheel body;

the exercise wheel brackets are in an annular shape and respectively provided on two sides of the exercise wheel body; a plurality of exercise wheel root bars are detachably installed circumferentially in sequence between the exercise wheel brackets on the two sides; an inner side of the exercise wheel root bar is an adhesive surface, and an outer side of the exercise wheel body is bonded to the adhesive surface; and the outer edge of the exercise wheel bracket has the contact portion protruding radially, and an outer edge of the contact portion protrudes beyond the exercise wheel root bars and the exercise wheel body.

Preferably, the adhesive surface of the inner side of the exercise wheel root bar is provided with a touch fastener, and is bonded to the outer side of the exercise wheel body through the touch fastener.

Preferably, the exercise wheel bracket is a split bracket, including a plurality of arc-shaped brackets spliced circumferentially in sequence, and the plurality of arc-shaped brackets are spliced in sequence to form the exercise wheel bracket in the annular shape.

Preferably, the exercise wheel supporting crossbar includes a supporting bar body and fixing parts; and two ends of the supporting bar body are fixedly connected to the brackets on the two sides through the fixing parts, a bearing inner ring of the silent bearing is fixedly sleeved on the supporting bar body, and a position of the silent bearing corresponds to the exercise wheel bracket.

Preferably, the silent bearing includes a bearing body and a rubber wheel; and a bearing inner ring of the bearing body is fixedly sleeved on the exercise wheel supporting crossbar, the rubber wheel is fixedly sleeved on a bearing outer ring of the bearing body, and an outer side of the rubber wheel is provided with an arc recess in contact with the contact portion of the outer edge of the exercise wheel bracket.

Preferably, the cat exercise wheel further includes an exercise wheel pin for switching the exercise wheel assembly between a locked state and a rolling state;

in the locked state, the exercise wheel pin is inserted laterally into a first pin hole in the bracket, and an end of the exercise wheel pin extends to one of a plurality of positioning holes circumferentially arranged in the exercise wheel bracket; and in the rolling state, the exercise wheel pin is inserted into a second pin hole in the bracket, and the end of the exercise wheel pin does not interfere with the exercise wheel bracket.

Preferably, the cat exercise wheel further includes a corner supporting crossbar, where the corner supporting crossbar is detachably installed between the brackets on the two sides and located on a side of the exercise wheel supporting crossbar away from the exercise wheel assembly; and the corner supporting crossbar is provided with a stop block corresponding to a position of the silent bearing, and the stop block at least covers a portion of a bearing outer ring of the silent bearing extending from the exercise wheel bracket to the corner supporting crossbar.

Preferably, two ends of the corner supporting crossbar are fixedly connected to the brackets on the two sides by bracket screws.

Preferably, the exercise wheel brackets of the exercise wheel assembly, supporting bar bodies of the exercise wheel supporting crossbars, and the corner supporting crossbar are all made of metal.

Compared with the prior art, the present disclosure has the following beneficial effects:

1. In the present disclosure, the brackets and the exercise wheel supporting crossbars are detachably installed to form a rolling and supporting structure of the exercise wheel. The exercise wheel assembly can be erected on this structure for normal use. The structure is simple and easy to assemble and disassemble. Furthermore, by using a silent bearing with a soft rubber contact portion on the outer ring, the sound caused by the cat running on the exercise wheel is greatly reduced, making the usage environment comfortable and preventing the cat from being frightened by the noise of rotation of the exercise wheel, while enhancing the experience for both humans and pets.

2. In the present disclosure, the body of the cat exercise wheel is formed by connecting the split annular exercise wheel brackets on two sides and assembling a plurality of exercise wheel root bars having the touch fasteners, solving the problem of overly complicated installation of the cat exercise wheel and achieving the effect of reducing installation steps and time.

3. In the present disclosure, the exercise wheel brackets, supporting bar bodies of the exercise wheel supporting crossbars, and the corner supporting crossbar are made of iron. While ensuring stable operation of the product, compared to similar the cat exercise wheel products with wooden structures, the iron-framed cat exercise wheel is lighter in weight. It is more convenient to install and adjust the placement of the cat exercise wheel. The lighter structure allows cats to run more easily on the exercise wheel.

4. In the present disclosure, the base structure of the exercise wheel is improved. The addition of a stop bar structure to a side of the exercise wheel supporting crossbar solves the safety problem that might arise from the cat's paw touching the working exercise wheel, preventing the paw from injury due to touching the operating exercise wheel and protecting the cat's safety.

BRIEF DESCRIPTION OF THE DRAWINGS

Other features, objects, and advantages of the present disclosure will become more apparent from the following detailed description of non-limiting embodiments with reference to the drawings.

In the figures.

| | |
|---|---|
| Exercise wheel assembly 1 | Fixing part 3-2 |
| Exercise wheel bracket 1-1 | Silent bearing 3-3 |
| Exercise wheel root bar 1-2 | Rubber wheel 3-3-1 |
| Exercise wheel body 1-3 | Bearing body 3-3-2 |
| Bracket 2 | Arc recess 3-3-3 |
| Bracket screw 2-1 | Corner supporting crossbar 4 |
| Exercise wheel supporting crossbar 3 | Exercise wheel pin 5 |
| Supporting bar body 3-1 | |

DETAILED DESCRIPTION OF THE EMBODIMENTS

The present disclosure will be described in detail below with reference to specific embodiments. These embodiments will help those skilled in the art to further understand the present disclosure, but do not limit the present disclosure in any way. It should be noted that those skilled in the art can make several changes and improvements without departing from the concept of the present disclosure. These all fall within the scope of protection of the present disclosure.

The present disclosure discloses a cat exercise wheel, in which brackets and exercise wheel supporting crossbars are detachably installed to form an exercise wheel base. The exercise wheel assembly is erected on the base to complete installation. The structure is simple and easy to assemble and disassemble. Furthermore, by using the silent bearing, the sound caused by the cat running on the exercise wheel is greatly reduced, making the usage environment comfortable and preventing the cat from being frightened by the noise, while enhancing the experience for both humans and pets.

Figure 1:
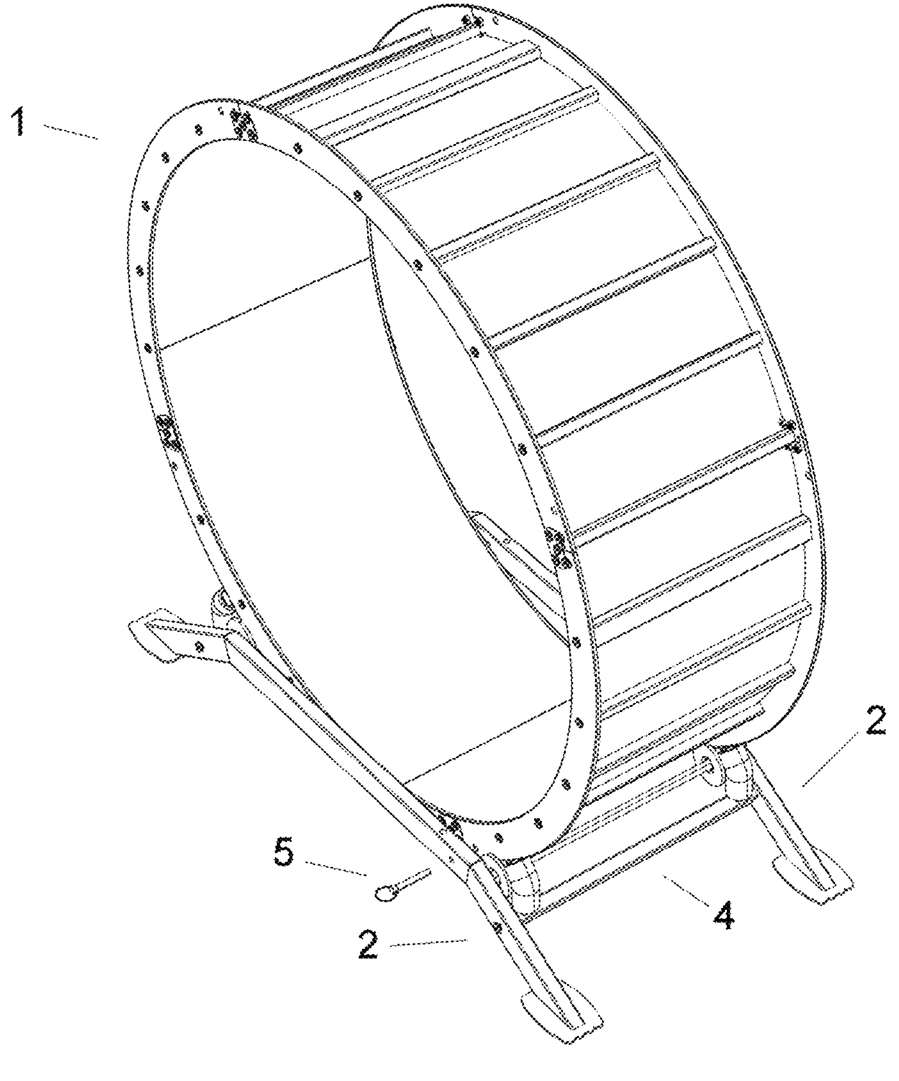
FIG. 1 is a schematic diagram of the overall structure of the present disclosure.

The cat exercise wheel provided by the present disclosure, as shown in FIG. 1, includes the exercise wheel assembly 1, the brackets 2, and the exercise wheel supporting crossbars 3. Two brackets 2 are installed side-by-side on two sides of the exercise wheel assembly 1. At least two exercise wheel supporting crossbars 3 are arranged side-by-side and detachably installed between the two brackets 2. The exercise wheel assembly 1 is erected on the exercise wheel supporting crossbars 3. The silent bearing 3-3 is installed on the exercise wheel supporting crossbar 3. The outer ring of the silent bearing has a soft rubber contact portion. The outer edge of the exercise wheel bracket 1-1 of the exercise wheel assembly 1 has a contact portion protruding radially, and the contact portion of the outer edge of the exercise wheel bracket 1-1 is in contact with the soft rubber contact portion of the silent bearing 3-3.

Figure 2:
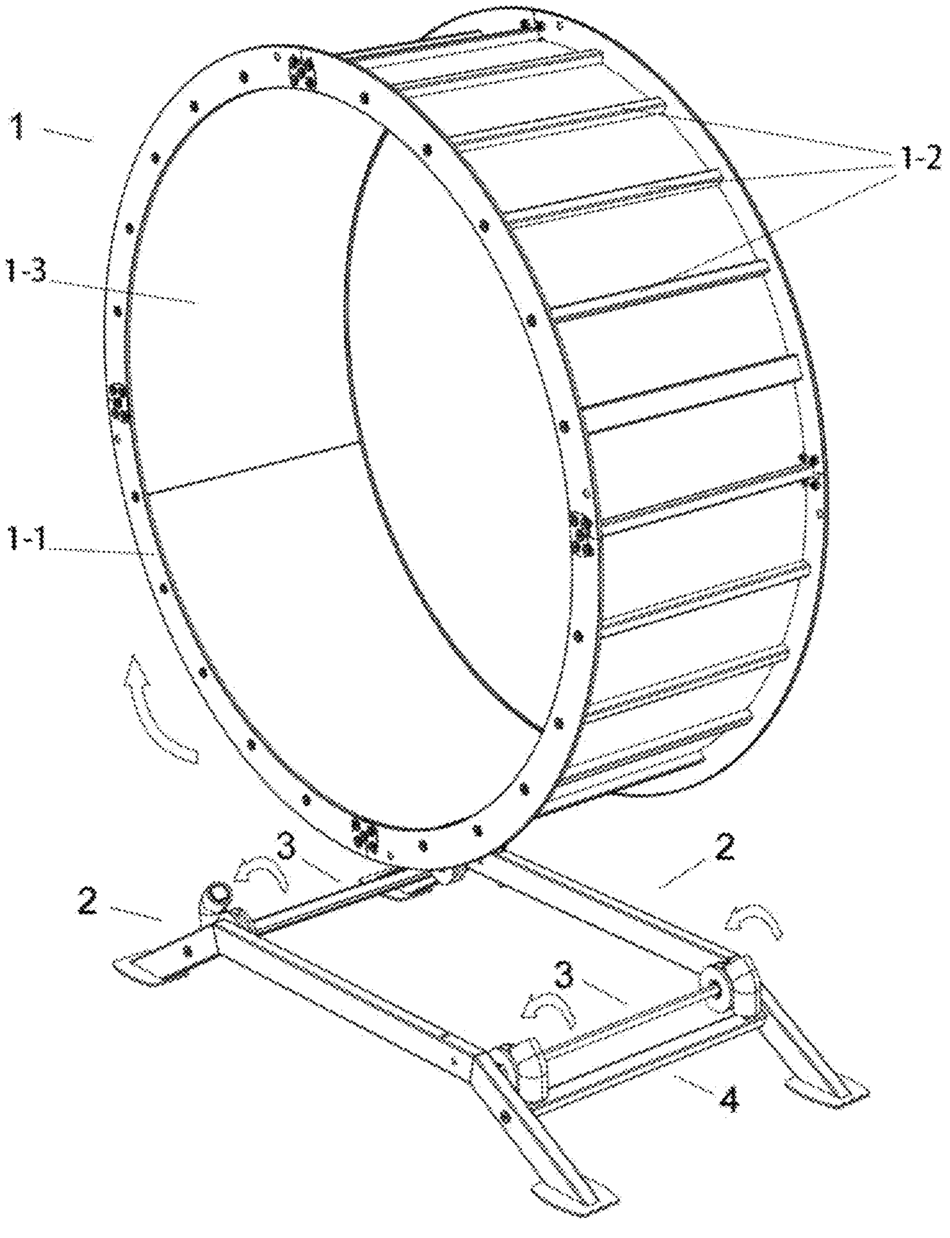
FIG. 2 is an exploded view of an exercise wheel and a bracket of the present disclosure.
Figure 3:
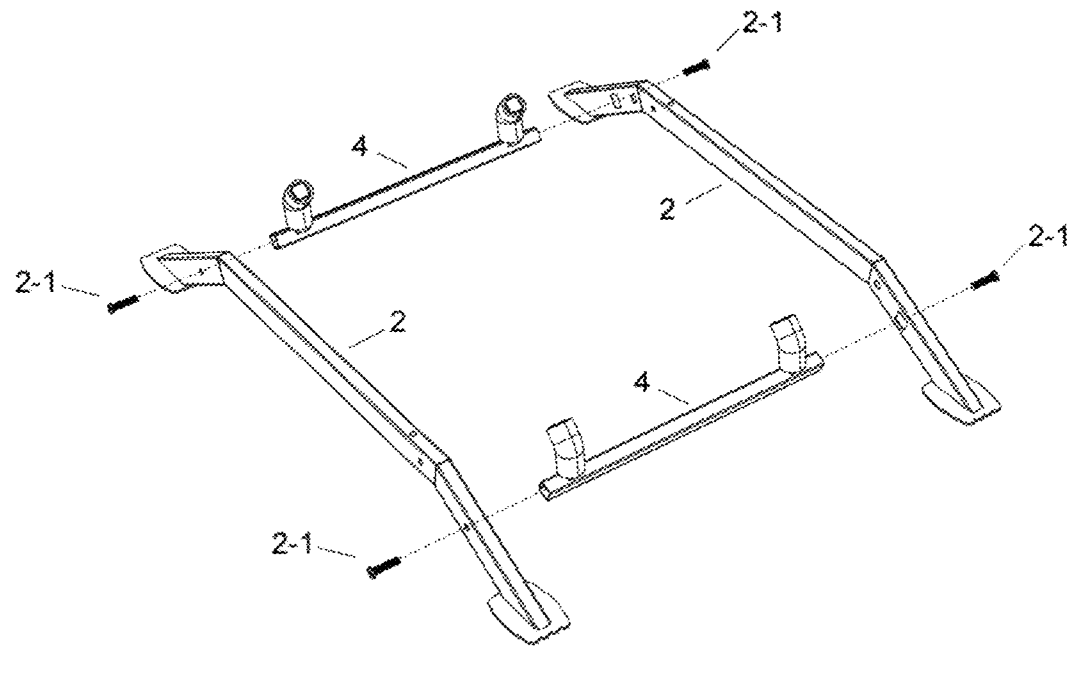
FIG. 3 is an exploded view of the bracket and a corner supporting crossbar of the present disclosure.

As shown in FIG. 2, when the exercise wheel supporting crossbars 3 are installed between the brackets 2 on the two sides, the base portion of the entire cat exercise wheel is completely installed. The exercise wheel assembly 1 can then be erected on the base portion for normal use. Compared with the traditional cat exercise wheel with an integral structure, this split-type cat exercise wheel has a simpler structure, is easier to assemble and disassemble, and is more convenient for transportation. Furthermore, by providing the soft rubber contact portion of the outer ring of the silent bearing 3-3, the contact portion of the outer edge of the exercise wheel bracket 1-1 is in direct contact with the soft rubber contact portion. During rolling, the exercise wheel assembly 1 as the whole is in contact with the base portion through a plurality of silent bearings 3-3, preventing the generation of unnecessary noise. This ensures a comfortable usage environment and prevents the cat from being frightened by the noise.

In a preferred embodiment, as shown in FIG. 2, the exercise wheel assembly 1 includes the exercise wheel brackets 1-1, the exercise wheel root bars 1-2, and the exercise wheel body 1-3. The exercise wheel brackets 1-1 are in an annular shape and respectively provided on two sides of the exercise wheel body 1-3. The plurality of exercise wheel root bars 1-2 are detachably installed circumferentially in sequence between the exercise wheel brackets 1-1 on the two sides. The inner side of the exercise wheel root bar 1-2 is an adhesive surface, and the outer side of the exercise wheel body 1-3 is bonded to the adhesive surface. The outer edge of the exercise wheel bracket 1-1 has a contact portion protruding radially, and the outer edge of the contact portion protrudes beyond the exercise wheel root bars 1-2 and the exercise wheel body 1-3. The adhesive surface of the inner side of the exercise wheel root bar 1-2 is provided with a touch fastener, and is bonded to the outer side of the exercise wheel body 1-3 through the touch fastener. The exercise wheel bracket 1-1 is a split bracket, including a plurality of arc-shaped brackets spliced circumferentially in sequence, and the plurality of arc-shaped brackets are spliced in sequence to form the exercise wheel bracket 1-1 in the annular shape. Specifically, the exercise wheel assembly 1 includes a total of eight arc-shaped brackets on two sides and twenty exercise wheel root bars 1-2 installed circumferentially. The cat exercise wheel body is assembled by the split brackets on both sides and the plurality of exercise wheel root bars with the touch fasteners, solving the problem of overly complicated installation of the cat exercise wheel and reducing installation steps and time.

Figure 4:
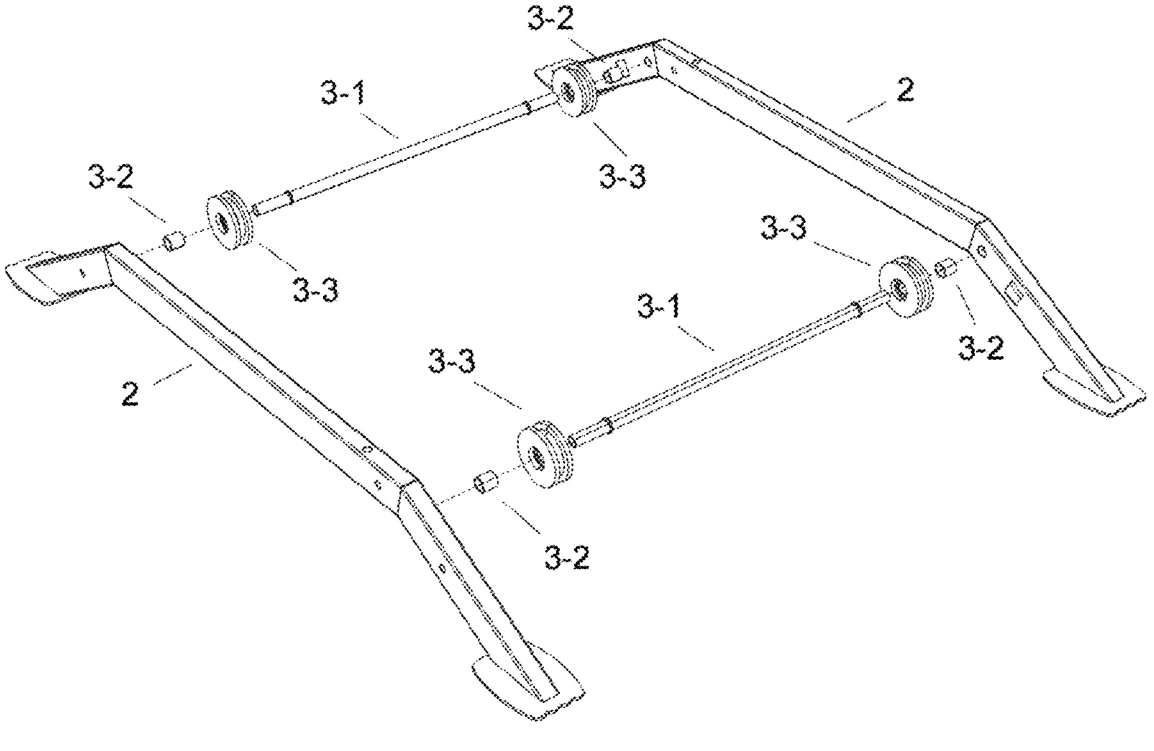
FIG. 4 is an exploded view of the bracket and an exercise wheel supporting crossbar of the present disclosure.
Figure 5:
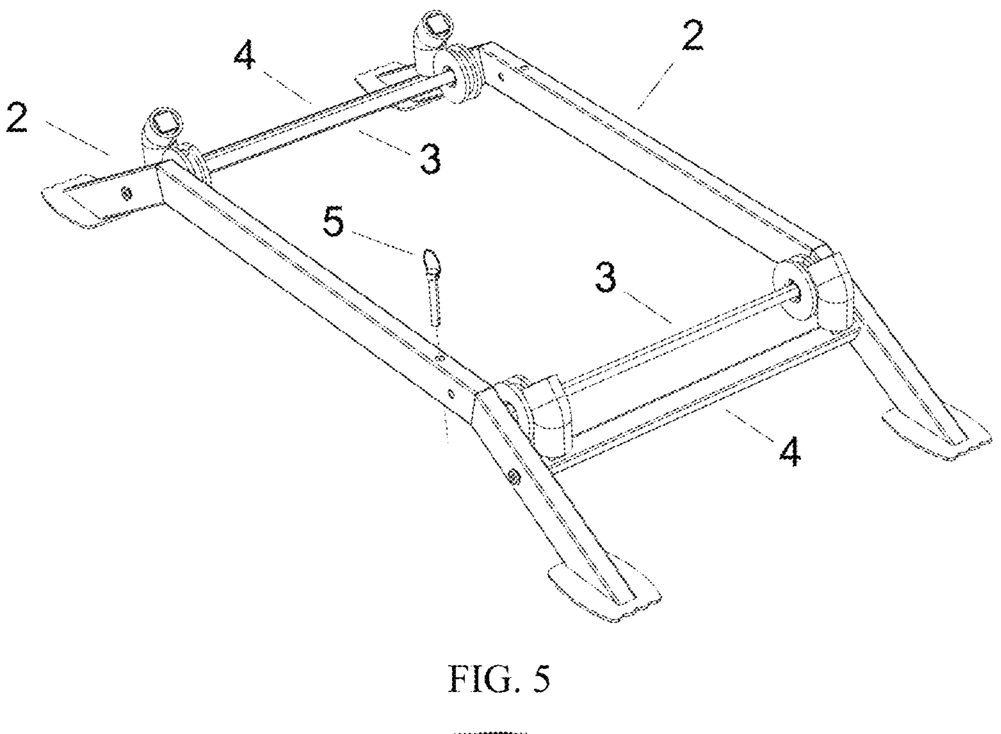
FIG. 5 is an assembly diagram of the bracket, the corner supporting crossbar, and the exercise wheel supporting crossbar of the present disclosure.

In a preferred embodiment, as shown in FIG. 4, the exercise wheel supporting crossbar 3 includes the supporting bar body 3-1 and the fixing parts 3-2. Two ends of the supporting bar body 3-1 are fixedly connected to the brackets 2 on the two sides through the fixing parts 3-2. The bearing inner ring of the silent bearing 3-3 is fixedly sleeved on the supporting bar body 3-1, and the position of the silent bearing 3-3 corresponds to the exercise wheel bracket 1-1.

Figure 6:
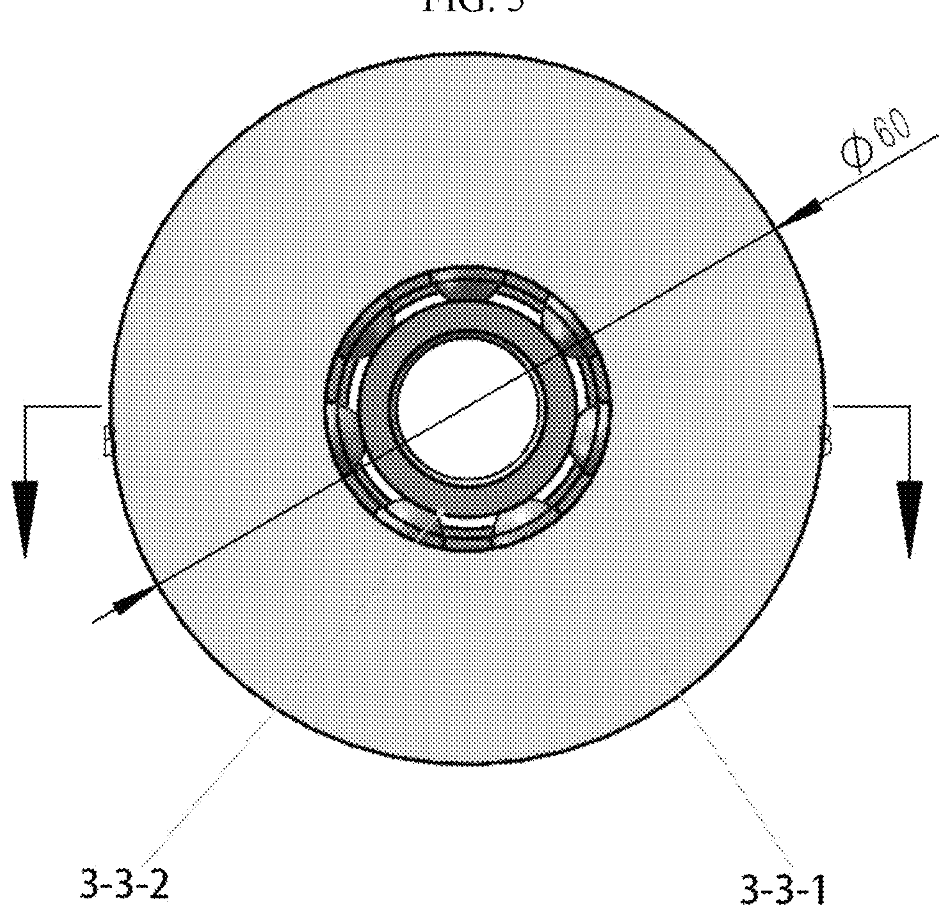
FIG. 6 is a schematic diagram of the structure of a silent bearing of the present disclosure.
Figure 7:
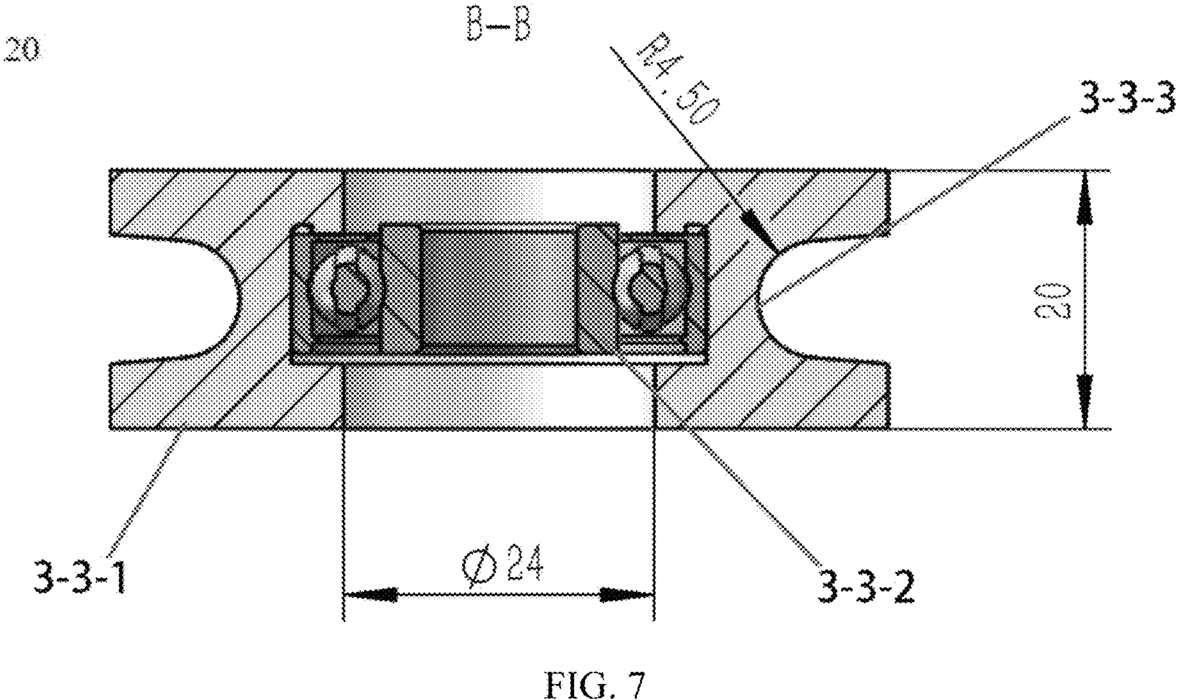
FIG. 7 is a cross-sectional view of the structure in FIG. 6 from the perspective of B-B.

In a preferred embodiment, as shown in FIGS. 6-7, the silent bearing 3-3 includes the bearing body 3-3-2 and the rubber wheel 3-3-1. The bearing inner ring of the bearing body 3-3-2 is fixedly sleeved on the exercise wheel supporting crossbar 3, and the rubber wheel 3-3-1 is fixedly sleeved on the bearing outer ring of the bearing body 3-3-2. The outer side of the rubber wheel 3-3-1 is provided with the arc recess 3-3-3 in contact with the contact portion of the outer edge of the exercise wheel bracket 1-1. The rubber wheel 3-3-1 is made entirely of the soft rubber material, which can reduce noise. A part of the bearing body adopts the ball bearing and beats radially, which further reduces noise and improves stability in comparison with traditional pulleys. The bearing outer ring is provided with the arc recess 3-3-3, and the contact portion of the outer edge of the exercise wheel bracket 1-1 is clamped into the arc recess 3-3-3. The use of the arc recess 3-3-3 reduces the contact area with the exercise wheel assembly 1, thereby reducing noise.

In a preferred embodiment, the cat exercise wheel further includes the exercise wheel pin 5 for switching the exercise wheel assembly 1 between a locked state and a rolling state. In the locked state, the exercise wheel pin 5 is inserted laterally into a first pin hole in the bracket 2, and an end of the exercise wheel pin 5 extends to one of a plurality of positioning holes circumferentially arranged in the exercise wheel bracket 1-1. In the rolling state, the exercise wheel pin 5 is inserted into a second pin hole in the bracket 2, and the end of the exercise wheel pin 5 does not interfere with the exercise wheel bracket 1-1.

When faced with a rotating structure, cats often instinctively touch or explore the edge of the exercise wheel or a gap in the structure with their paws. Their actions are somewhat random and unpredictable, such as sudden acceleration, abrupt stops, or jumping off the exercise wheel. During these processes, the cat's limbs may come into contact with the edge of the exercise wheel or the supporting structure, potentially resulting in the cat's paw being pinched, affecting the cat's user experience and safety. Therefore, in a preferred embodiment, the cat exercise wheel further includes the corner supporting crossbar 4, and the corner supporting crossbar 4 is detachably installed between the brackets 2 on the two sides and located on the side of the exercise wheel supporting crossbar 3 away from the exercise wheel assembly 1. The corner supporting crossbar 4 is provided with a stop block corresponding to the position of the silent bearing 3-3, and the stop block at least covers the portion of the bearing outer ring of the silent bearing 3-3 extending from the exercise wheel bracket 1-1 to the corner supporting crossbar 4. Two ends of the corner supporting crossbar 4 are fixedly connected to the brackets 2 on the two sides by the bracket screws 2-1. The addition of the corner supporting crossbar 4 solves the safety problem that might arise from the cat's paw touching the working exercise wheel, preventing the paw from injury due to touching the operating exercise wheel and protecting the cat's safety.

In a preferred embodiment, the exercise wheel brackets 1-1 of the exercise wheel assembly 1, the supporting bar bodies 3-1 of the exercise wheel supporting crossbars 3, and the corner supporting crossbar 4 are all made of metal, preferably iron. By using the iron bracket, compared with similar cat exercise wheel products with wooden structures on the market, the iron-framed cat exercise wheel is lighter in weight, while ensuring stable operation of the product. It is more convenient to install and adjust the placement of the cat exercise wheel. The lighter structure allows cats to run more easily on the exercise wheel.

In the description of the present application, it should be understood that the terms "upper", "lower", "front", "rear", "left", "right", "vertical", "horizontal", "top", "bottom", "inner", "outer" and the like indicate the orientation or positional relationship based on the orientation or positional relationship shown in the drawings. They are only for the convenience of describing the present application and simplifying the description, and do not indicate or imply that the device or element referred to must have a specific orientation, or be constructed and operated in a specific orientation. Therefore, they should not be construed as limitations on the present application.

The specific embodiments of the present disclosure have been described above. It should be understood that the present disclosure is not limited to the specific embodiments described above. Those skilled in the art can make various changes or modifications within the scope of the claims, which do not affect the substantive content of the present disclosure. The embodiments as well as features in the embodiments of the present application can be arbitrarily combined with each other in case of being no conflict.

What is claimed is:

1. A cat exercise wheel, comprising an exercise wheel assembly, two brackets, and at least two exercise wheel supporting crossbars, wherein the two brackets are installed side-by-side on two sides of the exercise wheel assembly;

the at least two exercise wheel supporting crossbars are arranged side-by-side and detachably installed between the two brackets, and the exercise wheel assembly is erected on the at least two exercise wheel supporting crossbars; and a pair of silent bearings are installed on each of the at least two exercise wheel supporting crossbars, a pair of exercise wheel brackets are disposed at an outer circumference of the exercise wheel assembly, an outer ring of each of the silent bearings has a soft rubber contact portion, an outer edge of each exercise wheel bracket has a contact portion protruding radially, and the contact portion of the outer edge of each exercise wheel bracket is in contact with the soft rubber contact portion of at least two of the silent bearings, wherein each silent bearing comprises a bearing body and a rubber wheel; and a bearing inner ring of the bearing body is fixedly sleeved on each of the at least two exercise wheel supporting crossbars, the rubber wheel is fixedly sleeved on a bearing outer ring of the bearing body, and an outer side of the rubber wheel is provided with a u-shaped recess disposed around a circumference of the rubber wheel, said u-shaped recess receiving therein and in contact with the contact portion of the outer edge of the exercise wheel bracket disposed at the outer circumference of the exercise wheel assembly.

2. The cat exercise wheel according to claim 1, wherein the exercise wheel assembly comprises the exercise wheel brackets, a plurality of exercise wheel root bars, and an exercise wheel body;

the exercise wheel brackets are in an annular shape and respectively provided on two sides of the exercise wheel body; the plurality of exercise wheel root bars are detachably installed circumferentially in sequence between the exercise wheel brackets on the two sides of the exercise wheel body; and an inner side of each of the plurality of exercise wheel root bars is an adhesive surface, and an outer side of the exercise wheel body is bonded to the adhesive surface; and the outer edge of each exercise wheel bracket has the contact portion protruding radially, and an outer edge of the contact portion protrudes beyond the plurality of exercise wheel root bars and the exercise wheel body.

3. The cat exercise wheel according to claim 2, wherein the adhesive surface of the inner side of each of the plurality of exercise wheel root bars is provided with a touch fastener, and is bonded to the outer side of the exercise wheel body through the touch fastener.

4. The cat exercise wheel according to claim 2, wherein the exercise wheel bracket is a split bracket, comprising a plurality of arc-shaped brackets spliced circumferentially in sequence, and the plurality of arc-shaped brackets are spliced in sequence to form the exercise wheel bracket in the annular shape.

5. The cat exercise wheel according to claim 1, wherein each of the at least two exercise wheel supporting crossbars comprises a supporting bar body and fixing parts; and two ends of the supporting bar body are fixedly connected to the two brackets on the two sides through the fixing parts, a bearing inner ring of the silent bearing is fixedly sleeved on the supporting bar body, and a position of the silent bearing corresponds to the exercise wheel bracket.

6. The cat exercise wheel according to claim 1, further comprising an exercise wheel pin for switching the exercise wheel assembly between a locked state and a rolling state; wherein in the locked state, the exercise wheel pin is inserted laterally into a first pin hole in one of the two brackets, and an end of the exercise wheel pin extends to one of a plurality of positioning holes circumferentially arranged in the exercise wheel bracket; and in the rolling state, the exercise wheel pin is inserted into a second pin hole in one of the two brackets, wherein insertion of the exercise wheel pin into the second pin hole in the rolling state is perpendicular to lateral insertion of the exercise wheel pin into the first pin hole in the locked state, and the end of the exercise wheel pin does not interfere with the exercise wheel bracket.

7. The cat exercise wheel according to claim 1, further comprising a corner supporting crossbar, wherein the corner supporting crossbar is detachably installed between the two brackets on the two sides and located on a side of each of the at least two exercise wheel supporting crossbars away from the exercise wheel assembly; and the corner supporting crossbar is provided with a stop block corresponding to a position of the silent bearing, and the stop block at least covers a portion of a bearing outer ring of the silent bearing extending from the exercise wheel bracket to the corner supporting crossbar.

8. The cat exercise wheel according to claim 7, wherein two ends of the corner supporting crossbar are fixedly connected to the two brackets on the two sides by bracket screws.

9. The cat exercise wheel according to claim 7, wherein the exercise wheel bracket of the exercise wheel assembly, a supporting bar body of each of the at least two exercise wheel supporting crossbars, and the corner supporting crossbar are all made of metal.

* * * * *